(12) United States Patent
Trott (10) Patent No.: US 9,742,849 B2
(45) Date of Patent: Aug. 22, 2017

(54) METHODS AND SYSTEMS FOR ESTABLISHING COLLABORATIVE COMMUNICATIONS BETWEEN DEVICES USING AMBIENT AUDIO

(75) Inventor: Mitchell Trott, San Mateo, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 951 days.

(21) Appl. No.: 13/146,941

(22) PCT Filed: Jan. 30, 2009

(86) PCT No.: PCT/US2009/000620
§ 371 (c)(1),
(2), (4) Date: Jul. 29, 2011

(87) PCT Pub. No.: WO2010/087797
PCT Pub. Date: Aug. 5, 2010

(65) Prior Publication Data
US 2011/0289224 A1 Nov. 24, 2011

(51) Int. Cl.
*G06F 15/16* (2006.01)
*H04L 29/08* (2006.01)
*H04L 29/06* (2006.01)

(52) U.S. Cl.
CPC .......... *H04L 67/14* (2013.01); *H04L 65/1069* (2013.01); *H04L 65/4038* (2013.01); *H04L 67/16* (2013.01)

(58) Field of Classification Search
USPC .......... 719/312, 317, 328; 709/202–205, 758
See application file for complete search history.

(56) References Cited

U.S. PATENT DOCUMENTS

| | | | |
|---|---|---|---|
| 8,280,948 B1* | 10/2012 | Chen ............................. | 709/203 |
| 2002/0032730 A1* | 3/2002 | Amit et al. ................... | 709/204 |
| 2004/0114541 A1* | 6/2004 | Caspi et al. .................. | 370/260 |
| 2004/0179036 A1* | 9/2004 | Teplov et al. ................. | 345/751 |
| 2005/0147256 A1* | 7/2005 | Peters et al. ..................... | 381/56 |
| 2005/0262201 A1* | 11/2005 | Rudolph et al. .............. | 709/205 |
| 2007/0050448 A1* | 3/2007 | Gonen et al. ................. | 709/204 |
| 2007/0130473 A1* | 6/2007 | Mazotas ....................... | 713/183 |

(Continued)

FOREIGN PATENT DOCUMENTS

| | | | | |
|---|---|---|---|---|
| CN | 101156487 A | 4/2008 | | |
| EP | 1307038 A2 * | 5/2003 | ............. | H04M 3/56 |
| EP | 1986145 A1 | 10/2008 | | |

OTHER PUBLICATIONS

Search Report, European Patent Office, Jan. 14, 2015, EP Patent Application No. 09839374.7, Filed Jul. 29, 2011.

(Continued)

*Primary Examiner* — Aftab N. Khan
(74) *Attorney, Agent, or Firm* — HP Inc. Patent Department (57) ABSTRACT

Various embodiments of the present invention are directed to systems and methods for enabling two or more devices in the same ambient audio environment to become automatically interconnected so that information can be exchanged between the devices. The two or more device detect substantially the same sounds, such as people talking in a meeting, automatically determine this fact and enter the devices into an information and document sharing relationship via a network.

20 Claims, 10 Drawing Sheets

(56) References Cited

U.S. PATENT DOCUMENTS

2007/0130580 A1*  6/2007  Covell et al. .................. 725/18
2007/0294224 A1* 12/2007  Heler ............................... 707/3
2009/0265775 A1  10/2009  Wisely et al.
2010/0086138 A1*  4/2010  Nicolino et al. ............... 381/56
2010/0192072 A1*  7/2010  Spataro et al. ............... 715/753
2012/0159354 A1*  6/2012  Van Wie et al. ............. 715/758

OTHER PUBLICATIONS

Yan Ke et al: "Computer Vision for Music Identification", 2005 IEEE Computer Society Conf On Computer Vision and Pattern Recognition, Jun. 20-25, 2005, IEEE, vol. 1, pp. 597-604.

Fink et al~Spcial-andI nteractive-television Applications Based on Real-Time Ambient-Audio Identification~Proceedings of the EuroITV 2006~10 pages.

* cited by examiner

//METHODS AND SYSTEMS FOR ESTABLISHING COLLABORATIVE COMMUNICATIONS BETWEEN DEVICES USING AMBIENT AUDIO

TECHNICAL FIELD

Embodiments of the present invention are directed to collaborative systems and methods for exchanging information.

BACKGROUND

Effective communication of ideas is often characterized by collaborating parties working close together. However, participants in conventional meeting scenarios are often hindered by having to take unnatural steps to achieve simple forms of collaboration. For example, audience members listening to a presentation may have to copy down a file name or URL to get a speaker's slides, or wait for the slides to be sent in e-mail after the presentation, which means that audience members have to give their e-mail addresses to the speaker or another organization. Telephone conference calls are a limited way in which participants can exchange ideas and information. Remote participants may have to ask for and copy down a Networking IP address to obtain documents or give their e-mail addresses to other participants. Also, a remote participant listening in on a conference call via a cell phone who would like to transition to a higher-quality landline telephone has to dial a long set of conference codes a second time and listen to distracting prompts.

Conventional methods and system for getting devices to recognize each other include sending passcodes, direct entry of IP addresses, physically connecting devices with cables, Universal Plug and Play, and using USB storage devices that contain configuration information just to name a few. All of these conventional methods and systems require user intervention that distracts participants from the presentation, require preparation time, and increase participant frustration. In other words, conventional methods and systems for getting devices to communicate in a collaborative setting do not mirror the natural trust relationship shared by people engaged in verbal communication. It is desirable to have methods and systems enabling devices used by collaborating participants to establish communications with limited participant effort.

DETAILED DESCRIPTION

Embodiments of the present invention are directed to systems and methods enabling two or more devices in a common ambient audio environment to become automatically interconnected over a network so that information can be exchanged between the devices with limited device user intervention. System and method embodiments also include enabling two or more devices in a common ambient audio environment to become automatically interconnected over a network so that audio and visual communications can be established between the devices with limited device user intervention.

The detailed description is organized as follows. A general description of a rendezvous and collaboration system is provided in a first subsection. A description of client interface hardware is provided in a second subsection. A description of rendezvous users experiences performed in accordance with embodiments of the present invention is provided in a third subsection. A description of a rendezvous process is provided in a fourth subsection. Finally, a description of other embodiments is provided in a fifth subsection.

I. Rendezvous and Collaboration System

Figure 1:
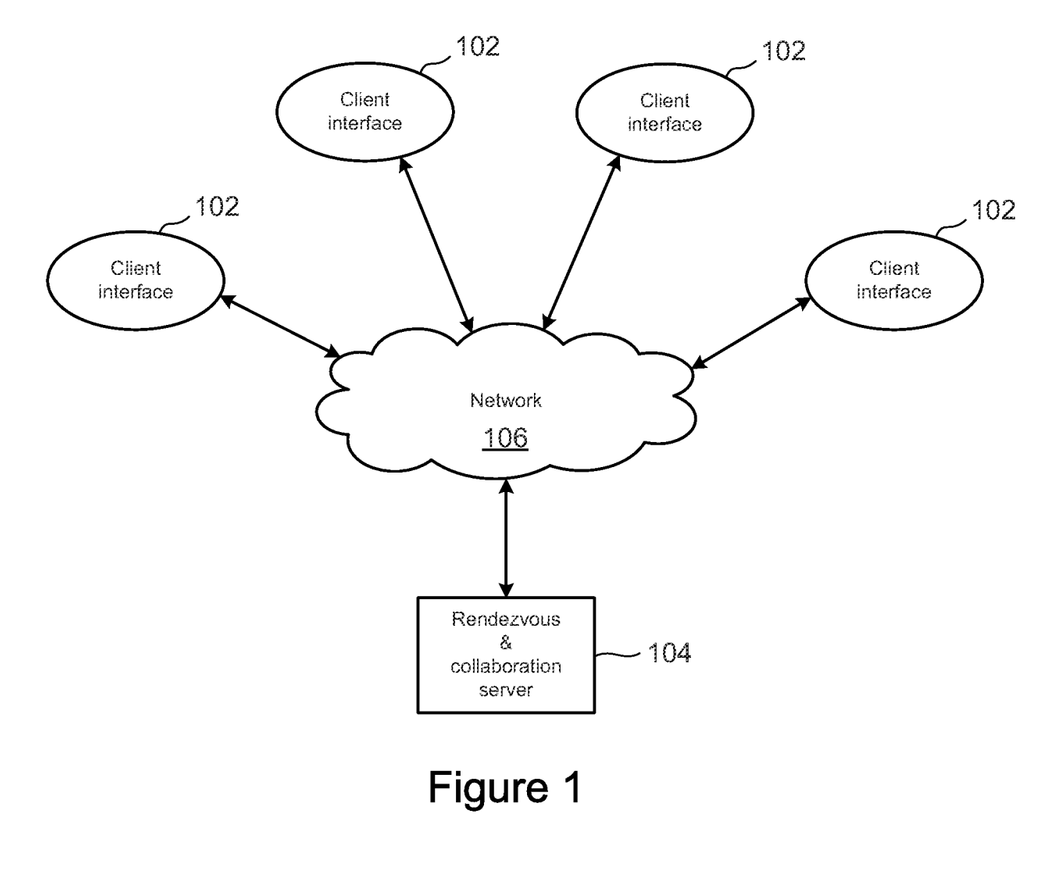
FIG. 1 shows a first rendezvous and collaboration system for providing a collaborative exchange of information over a network in accordance with embodiments of the present invention.

FIG. 1 shows a rendezvous and collaboration system 100 for providing a collaborative exchange of information over a network in accordance with embodiments of the present invention. The system 100 includes one or more client interfaces 102 and a rendezvous and collaboration server 104, all of which are in communication over a network 106. The server 104 is a correlating device that determines which client interfaces 102 are in a common audio environment and interconnects only those client interfaces 102 that are in the common audio environment so that documents and other information can be exchanged and/or voice and video communications can also be established. The network 106 can be the Internet, a local-area network, an intranet, a wide-area network, a wireless network, or any other system allowing client interfaces to communicate and exchange information.

In certain embodiments, the client interface 102 can be any device that allows a user to enter and receive information and is capable of presenting a user interface on a display screen, including, but not limited to: a desktop computer, a laptop computer, a portable computer, a telephone, a mobile phone, a display system, a television, a computer monitor, a navigation system, a portable media player, a personal digital assistant ("PDA"), a game console, a handheld electronic device, an embedded electronic device or appliance. Each client interface 102 includes an ambient audio detector, such as microphone, for monitoring, recording and collecting ambient audio, such as voices.

In certain embodiments, the client interface 102 can be composed of separate components mounted in a room, such as a conference room. In other words, components of a client interface, such as display and microphone, need not be confined to a particular device. For example, the client interface 102 can be composed of one or more microphones and/or a shared workspace in a conference room. The one or more microphones are operated to continuously monitor the ambient audio generated in the room. When a microphone and associated processing device detect a noise in the room, the microphone initiates communication with the rendezvous server 104 to determine whether a conference call is in progress that matches the ambient audio. If so, and if the conference call has an associated collaboration workspace, the rendezvous server 104 configures a display system, also present in the conference room, to display the shared workspace associated with the conference call in progress. For example, the shared workspace can be a shared virtual whiteboard or a shared presentation.

In certain embodiments, the client interface 102 does not include a display screen. For example, the client interface 102 may be composed of only an audio input, an audio output, and a numeric keypad; or the client interface 102 can be composed of only an audio input, audio output, and a single button that turns the client interface "on" and "off" and activates communication with the server 104. In still other embodiments, the client interface 102 can be composed of an audio input and an audio output and automatically activates communication with the server 104 when the client interface 102 detects noise, such as human speech.

Each client interface 102 collects one or more ambient audio segments called "snippets" and converts each snippet into a number of frames. A frame can be a data packet of fixed or variable length that is processed by contrast filters and thresholded to produce a k-bit descriptor. Contrast filters subtract neighboring rectangular spectrogram regions. For example, each snippet can be 5 s of recorded audio that is converted into 415 frames spaced approximately 12 ms apart, and each frame can be converted into a 32-bit descriptor. The collection of 32-bit descriptors associated with the one or more collected snippets is called an "audio summary." Techniques for generating audio summaries are well-known. For example, Ke, Y., Hoiem, D., Sukthankar, R., "Computer Vision for Music Identification," *In Proc. Computer Vision and Pattern Recognition*, (2005) describe methods for generating audio summaries in music identification. The music identification approach proposed by Ke et al. can be adapted to generate audio summaries for other ambient audio sources such as voice uttered by communicating parties. See also Fink, M., Covell, M., Shumeet, B., "Mass Personalization: Social and Interactive Applications using Sound-track Identification," *Multimed Tools Appl* (2008) 36:115-132.

The audio summary and an associated user identifier ("user id") for identifying a particular client interface 102 are sent to the server 104 via the network 106. In certain embodiments, the descriptors can be compressed statistical summaries of the ambient audio, as described in Ke et al. By sending statistical summaries, a user's acoustic privacy is maintained because the statistical summaries are not reversible. In other words, the original audio cannot be recovered from the descriptor. Thus, any conversations by the user or other individuals collected in the audio environment cannot be reproduced from the descriptor. In certain embodiments, the descriptors can be encrypted for extra privacy and security using one or more known encryption techniques, such as asymmetric or symmetric key encryption, and elliptic encryption.

For each audio summary provided by a client interface 102, the server 104 compares the audio summary with the entire collection of audio summaries sent to the server 104 from the other client interfaces 102. In other words, the descriptors comprising an audio summary provided by one client interface 102 can be compared with the descriptors in audio summaries provided by each of the other client interfaces 102. The server 104 compares the audio summaries and determines which audio summaries are sufficiently similar to form the common audio environment. In certain embodiments, the audio summaries can be time stamped to ensure that the audio summaries compared by the server 104 were collected at substantially the same time. A certain amount of time mis-alignment can be allowed to account for processing delays or clock inaccuracies. In certain embodiments, the server 104 sends to each client interface 102 in the common audio environment a list of the other client interfaces that are in the common audio environment and associated user ids via the network 106. The client interfaces 102 in the common audio environment can begin sharing documents and/or establishing audio and video communications in accordance with a collaboration application via the network 106.

II. Client Interface Hardware

Figure 2:
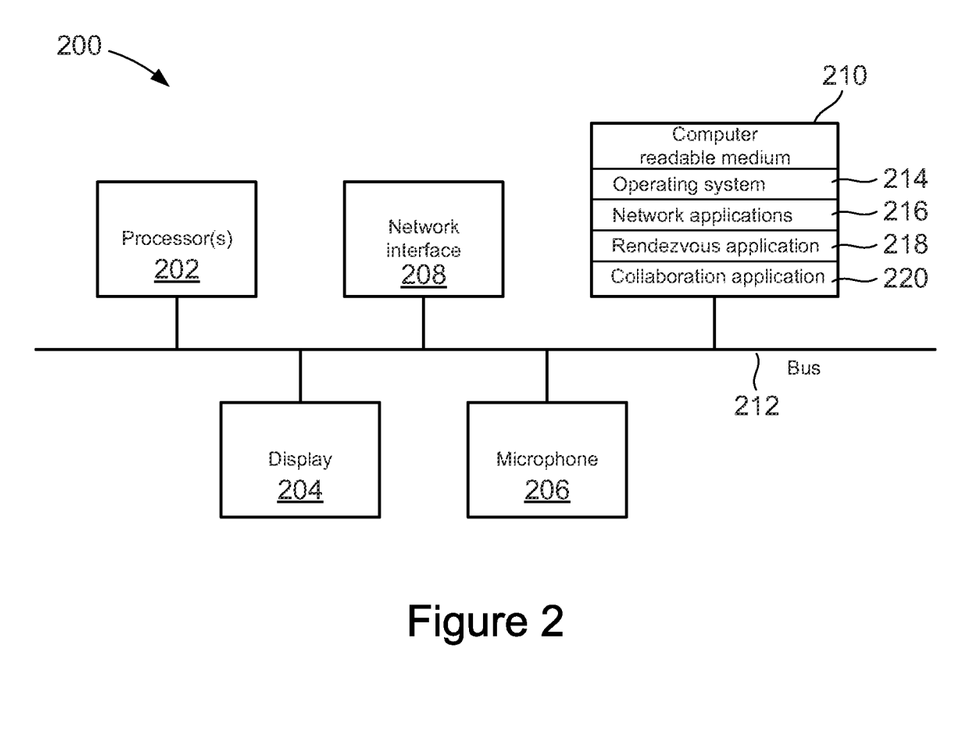
FIG. 2 shows a schematic representation of client interface hardware for engaging in a rendezvous and collaboration in accordance with embodiments of the present invention.

FIG. 2 shows a schematic representation of a client interface hardware system 200 configured in accordance with embodiments of the present invention. The system 200 includes one or more processors 202, such as a central processing unit; optionally one or more display devices 204, such as a monitor; a microphone interface 206; one or more network interfaces 208, such as a USB port, an Ethernet, or FireWire port; and one or more computer-readable mediums 210. Each of these components is operatively coupled to one or more buses 212. For example, the bus 212 can be an EISA, a PCI, a USB, a FireWire, a NuBus, or a PDS.

In other embodiments, the system 200 may not include display devices or input devices, such as keyboard or keypad; and the system 200 can be configured to generate an audio summary in the background without user input.

The computer readable medium 210 can be any medium that participates in providing instructions to the processor 202 for execution. For example, the computer readable medium 210 can be non-volatile media, such as a optical or a magnetic disk; volatile media, such as memory; and transmission media, such as coaxial cables, copper wire, and fiber optics. Transmission media can also take the form of acoustic, light, or radio frequency waves.

The computer-readable medium 210 also includes an operating system 214, such as Mac OS, Windows, Unix, and Linux; a network communications module 216; a rendezvous application 218; and a collaboration application 220. The operating system 214 can be multi-user, multiprocessing, multitasking, multithreading, real-time and the like. The operating system 214 can also perform basic tasks such as recognizing input from input devices, such as a keyboard or a keypad; sending output to the display 204; keeping track of files and directories on medium 210; controlling peripheral devices, such as disk drives, printers, image capture device; and managing traffic on the one or more buses 212. The network applications 216 includes various components for establishing and maintaining network connections, such as software for implementing communication protocols including TCP/IP, HTTP, Ethernet, USB, and FireWire.

The rendezvous and collaboration applications 218 and 220 provide various software components for enabling rendezvous and collaborations between client interfaces in the same ambient environment, as described below in subsections III-V. The server 104 hosts certain rendezvous and collaboration functions enabling the server 104 to interact with client interfaces 102 when the rendezvous and collaboration applications are activated as described below. In certain embodiments, some or all of the processes performed by the applications 218 and 220 can be integrated into the operating system 214. In certain embodiments, the processes can be at least partially implemented in digital electronic circuitry, or in computer hardware, firmware, software, or in any combination thereof.

The computer readable medium 210 can also store other software applications, including word processors, browsers, email, Instant Messaging, media players, and telephony software.

III. Rendezvous User Experiences

In this subsection, three exemplary rendezvous experiences performed in accordance with embodiments of the present invention are described. Note that embodiments of the present invention are not intended to be limited to these three experiences. System and method embodiments of the present invention can be used to create any number of different kinds of rendezvous experiences.

Figure 3:
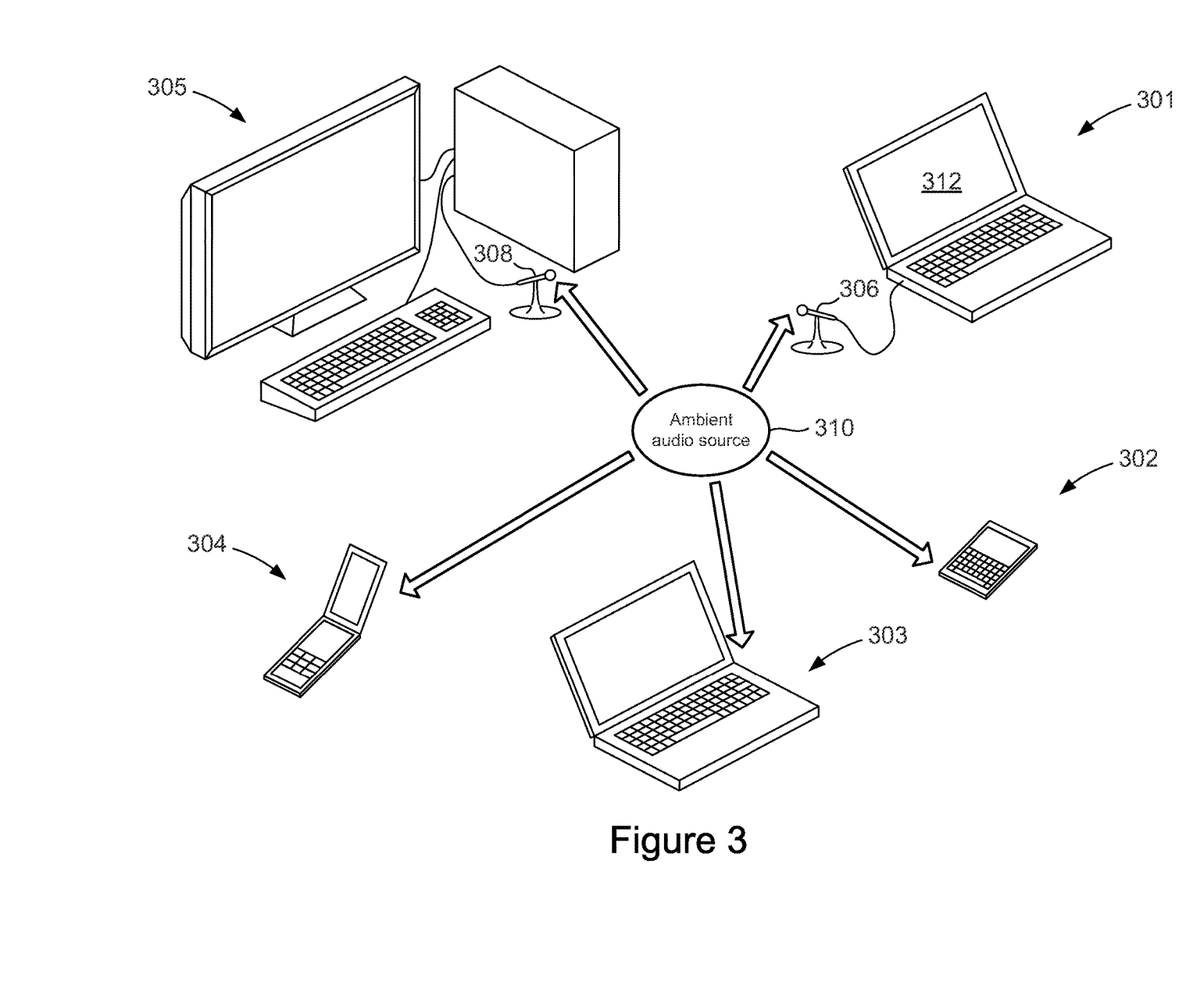
FIG. 3 shows a first rendezvous user experience performed in accordance with embodiments of the present invention.

FIG. 3 shows a first rendezvous user experience performed in accordance with embodiments of the present invention. In FIG. 3, five client interfaces 301-305 are disposed in a common location. The location can be a room, such as conference room, an auditorium, a convention hall, or any other suitable enclosure or unenclosed environment. As shown in FIG. 3, client interfaces 301 and 303 are laptop computers, client interface 302 is a PDA or a smart phone including computer-like functionality, client interface 304 is a mobile phone, and client interface 305 is a desk-top computer. The client interfaces 301 and 305 include external microphones 306 and 308, respectively, and the client interfaces 302-304 include internal microphones. The client interfaces 301-305 are all assumed to be connected to the server 104 (not shown) via a common network 106 (not shown), as described above in subsection I. FIG. 3 also includes an ambient audio source 310, which can be a voice generated by a person speaking or a combination of two or more voices uttered substantially simultaneously or at different times, such as the individual users of the client interfaces 301-305 freely talking around a conference table or a white board.

In order to begin a rendezvous process in accordance with embodiments of the present invention, each user operating one of the client interfaces 301-305 activates a rendezvous application stored on each of the client interfaces 301-305. For example, a user can activate the rendezvous application stored on the client interface 301 by pressing a particular button located on the key board or by mouse clicking on an icon displayed on the monitor 312. Thus, the users can activate the rendezvous applications without interrupting a conversation or presentation. The rendezvous application of each client interface establishes contact with the server 104 via the network 106 and begins collecting ambient audio generated in the room to produce audio summaries that are sent to the server 104. The server 104 uses the audio summaries to determine which of the client interfaces 301-305 are collecting substantially the same ambient audio and are, therefore, part of a common audio environment. A few seconds later, in certain embodiments, the server 104 can present each of the client interfaces 301-305 with an interface asking associated users if they would like a list of client interfaces that are in the common audio environment, or in other embodiments, the server 104 can activate a pop-up window or other display listing the client interfaces 301-305 and associated user ids that were identified as being in the common audio environment, as described above in subsection I. The display may also include an "ok" button that each user can click on to accept the list of client interfaces 301-305. When the list is accepted, a collaboration application is activated with the participant list comprising the identified computers and associated user ids. The collaboration application facilitates sharing of documents. For example, suppose the user of client interface 303 has a document that becomes the subject of discussion and the user of client 305 would like to have a copy of the document. The collaboration application located on the client interface 303 enables the user to upload a copy of the document and the user id of the client interface 305 to the server 104. The server 104 can activate a pop-up window on the client interface 305 indicating that a copy of the document is now available for downloading from the server 104.

Figure 4:
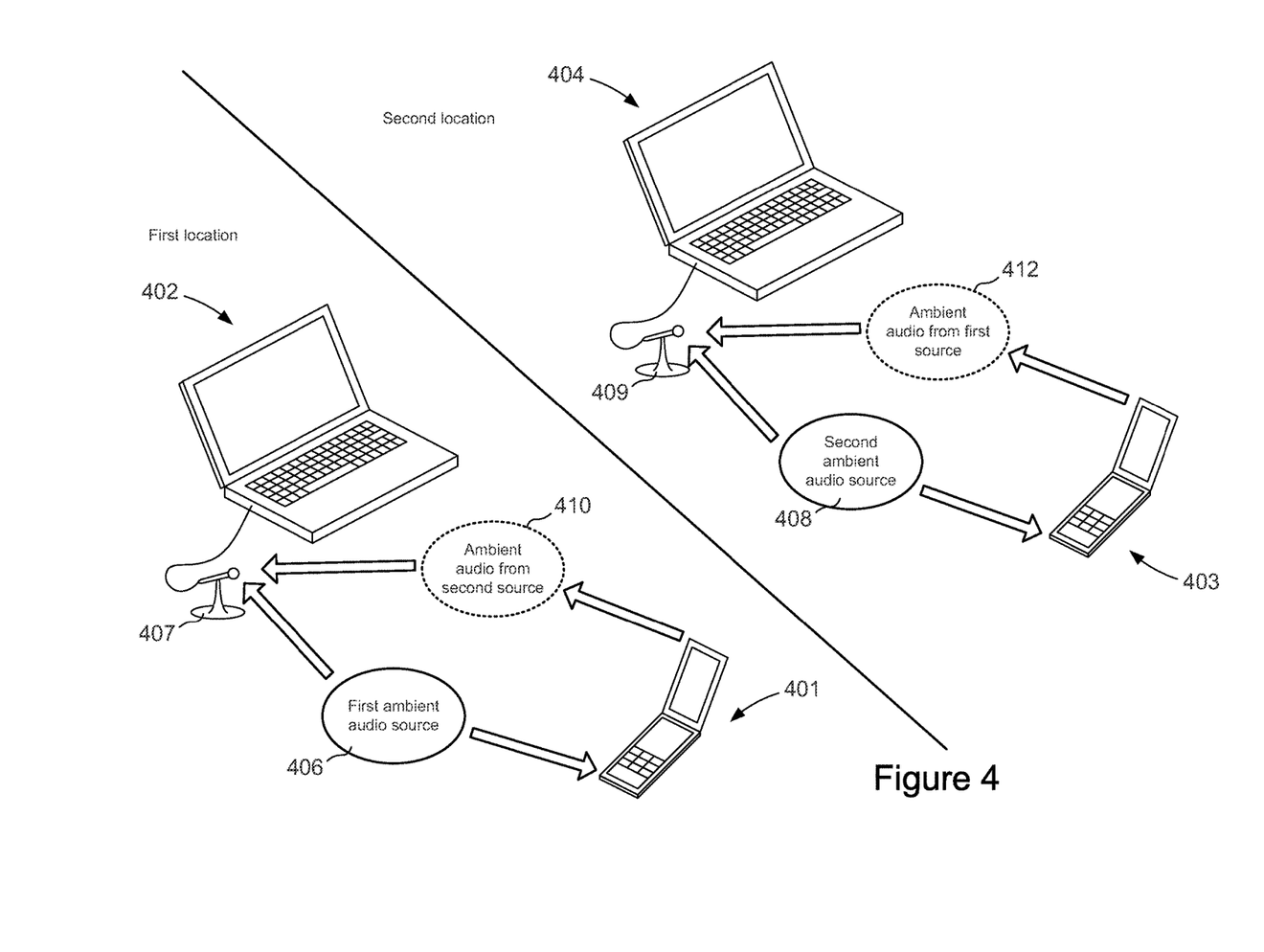
FIG. 4 shows a second rendezvous user experience performed in accordance with embodiments of the present invention.

FIG. 4 shows a second rendezvous user experience performed in accordance with embodiments of the present invention. In FIG. 4, a first user located at a first location possesses a first mobile phone 401 and a first laptop computer 402, and a second user located at a second location possesses a second mobile phone 403 and second laptop computer 404. The first location and the second location can be separate rooms in the same building, rooms in two different buildings located within the same city, state, country, or even different countries, and the buildings can be separated by tens, hundreds, and thousands of miles. The first user and the second user are initially engaged in a conversation over the cell phones 401 and 403, respectively. In order to begin a rendezvous process in accordance with embodiments of the present invention, the first user and the second user activate respective rendezvous applications stored on the laptop computers 402 and 404. Each rendezvous application establishes a separate connection to the server 104 and begins collecting audio samples at the respective locations. In certain embodiments, the first user and the second user can both activate the speakers on the mobile phones 401 and 403, respectively. As shown in FIG. 4, the first user speaking provides an ambient audio source 406 that is collected by the microphone of the mobile phone 401 and a microphone 407 connected to the laptop 402. The second user speaking provides an ambient audio source 408 that is collected by the microphone of the mobile phone 403 and a microphone 409 connected to the laptop 404. When the first user actives the speaker on the mobile phone 401, the second user's voice input to the mobile phone 403 becomes a second ambient audio source 410 at the first location, and when the second user actives the speaker on mobile phone 403, the first user's voice input to the mobile phone 401 becomes a second ambient audio source 412 at the second location. Thus, the voices uttered by both the first user and the second user are simultaneously collected by the microphones 407 and 409 at both locations and used to generate comparable audio summaries that are sent separately to the server 104. The server 104 processes the audio summaries, determines that the laptops 402 and 404 are in a common audio environment, and proceeds to send a list and user ids to the laptops 402 and 404 so the first and second users can activate collaboration applications, as described above with reference to FIG. 3.

In other embodiments, the speaker of only one of the mobile phones can be activated in establishing the rendezvous process. For example, suppose the first user activates the speaker on the first mobile phone 401, and the second user does not activate the speaker on the second mobile phone 403. Thus, the ambient audio 408 at the second location includes only the second user's voice, which is collected by the microphone 409 and used to generate an audio summary that is sent to the server 104. Meanwhile, at the first location, the ambient audio 406 and 410 collected by the microphone 407 is a combination of the first user's voice and the second user's voice broadcast from the speaker of the first mobile phone 401. The combined ambient audio 406 and 410 are used to generate an audio summary that is also sent to the server 104. The second user's voice is common to both audio summaries received by the server 104 and can be used to determine that the laptop computers 402 and 404 are in a common audio environment. The server 104 proceeds to send a list and user ids so the first and second users can activate collaboration applications, as described above with reference to FIG. 3.

Note that the audio experience described in FIG. 4 is not limited to using mobile phones to establish a rendezvous. In other embodiments, landline telephones with speakers can be used or any other suitable communication device capable of broadcasting sounds can be used. Also, any suitable user interface as described above in subsection I can be used in place of the laptops 402 and 404.

Figure 5A:
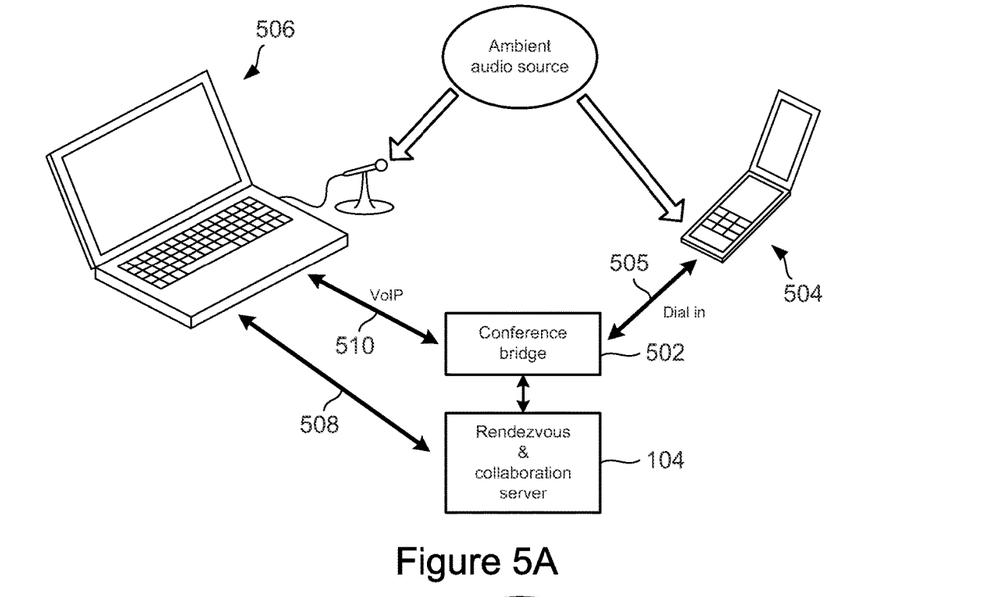
FIGS. 5A-5B show a third rendezvous user experience performed in accordance with embodiments of the present invention.
Figure 5B:
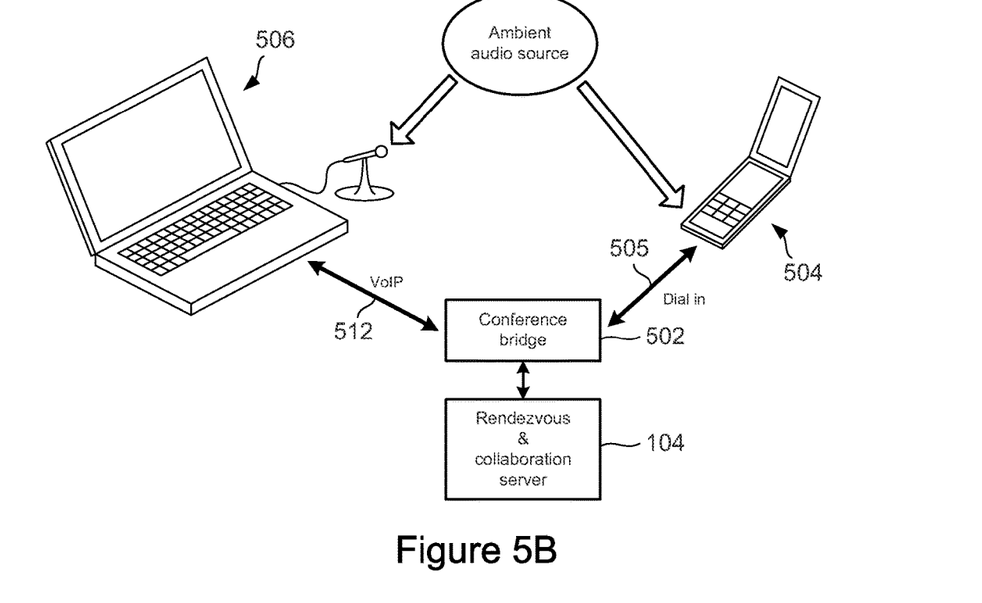

In other user experience embodiments, suppose a person on a mobile phone or a landline telephone is already engaged in a conference call and wants to transition to a laptop voice-over internet protocol ("VoIP") call. FIGS. 5A-5B show a third rendezvous user experience performed in accordance with embodiments of the present invention. The rendezvous and collaboration server 104 is in communication with a conference bridge 502, which is a device that links telephone lines and is used to connect multiple parties engaged in conference calls. As shown in FIGS. 5A-5B, the conference bridge 502 can be separate from the server 104, and in other embodiments, the conference bridge 502 can be integrated with the server 104. FIGS. 5A-5B show only one user dialed into 505 the conference bridge 502 via a mobile phone 504, but other users (not indicated) can be dialed into the conference bridge 502. The user can dial into the conference bridge using a particular conference number. In addition to providing telecommunications for the telephones dialed into the conference bridge 502, the conference bridge 502 is configured to operate as client interface that collects audio samples of the various conversations that are simultaneously taking place and sends audio summaries associated with each of the conversations to the server 104.

In a first embodiment represented in FIG. 5A, the user of the mobile phone 504 can switch to a VoIP call on a laptop computer 506 by activating the rendezvous application on the laptop 506, which established a network connection 508 with the server 104. The server 104 responds to the audio summaries sent from the laptop 506, as described above, and checks the audio summaries provided b the laptop 506 against the audio summaries associated with each of the conversations taking place via the conference bridge 502. When the server 104 identifies the appropriate conversation, the server 104 instructs the laptop 506 to initiate an appropriate VoIP call 510 to the conference bridge 502 causing the laptop 506 to join the conference call.

In a second embodiment represented in FIG. 5B, the user can initiate a VoIP call 512 from the laptop 506 to the conference bridge 502. The conference bridge 502 sends audio summaries of ambient audio collected by the laptop 506 to the server 104. When the server 104 finds audio summaries of an existing conference call taking place via the conference bridge 502 substantially matching the audio summaries provided by the laptop 506, the server 104 instructs the conference bridge 502 to join the laptop 506 VoIP call to the existing conference call.

In other embodiments, rather than switching from the mobile phone 504 to the laptop 506, the server 104 can be configured so that a user can join a conference call via a landline telephone (not shown). The user dials into the conference bridge 502 using the landline telephone. The user can continue speaking to generate ambient audio that is collected by the mobile phone 504 and the land line telephone. The server 104 compares the audio summaries provided by both the mobile phone 504 and the landline telephone via the conference bridge 502 and determines the landline telephone and the mobile phone 504 are part of a common audio environment. The server 104 joins the landline telephone to the conference call and the mobile phone 504 call can be terminated.

IV. Rendezvous and Collaboration Processes

Figure 6:
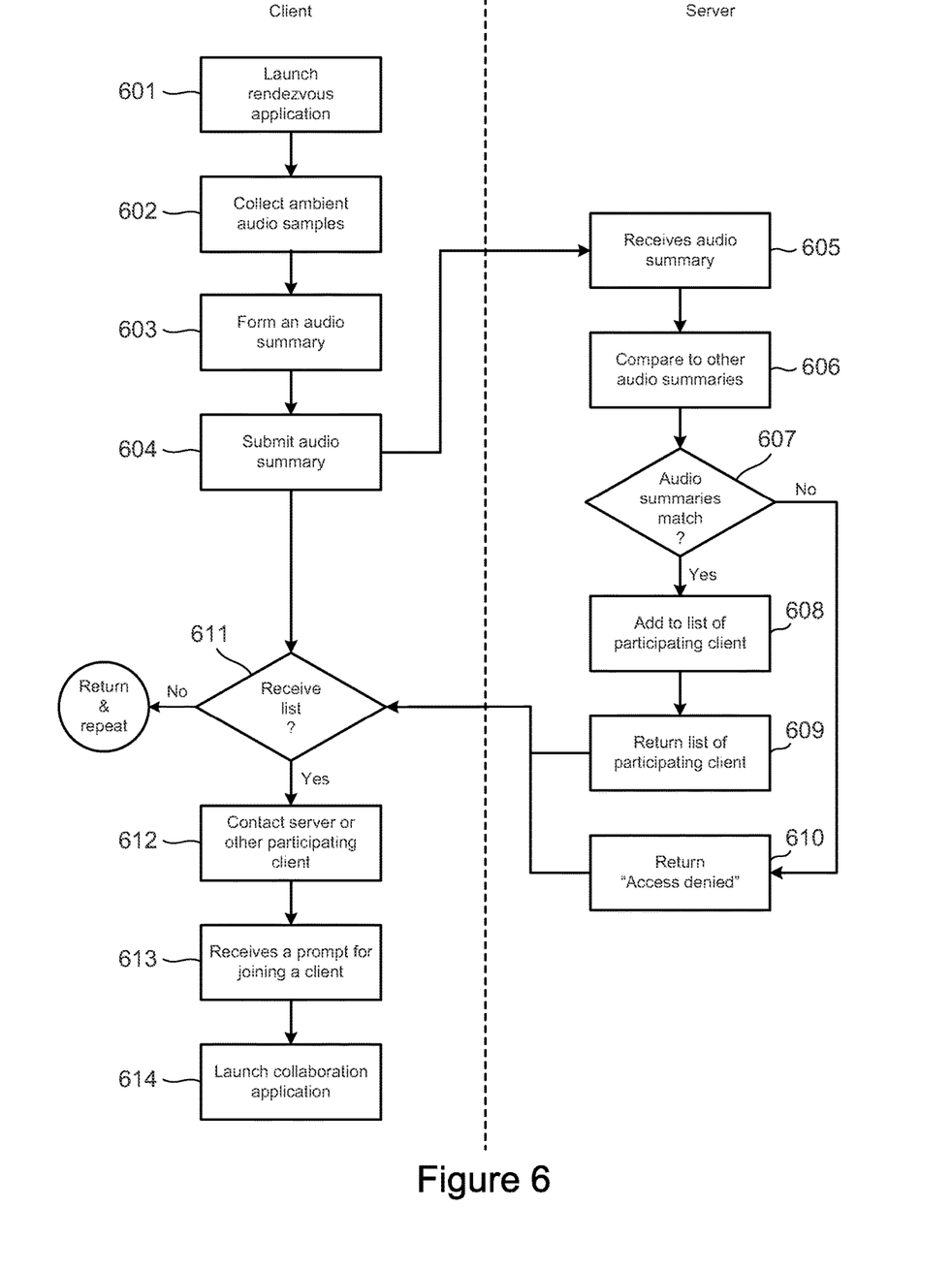
FIG. 6 shows a first control-flow diagram of operations performed by a client interface and a server in establishing a rendezvous and collaboration in accordance with embodiments of the present invention.

FIG. 6 shows a control-flow diagram of operations performed by a client interface and a rendezvous and collaboration server in establishing a rendezvous and collaboration experience between the client interface and other client interfaces in accordance with embodiments of the present application. Steps 601-604 and steps 611-614 are performed separately by each client interface, and steps 605-610 are performed by the rendezvous and collaboration server. The client interfaces are all pre-loaded with the name of the server.

In step 602, a user activates the rendezvous application stored on a client interface, as described above in subsections II and III. In step 602, the rendezvous application activates an ambient audio detector (e.g., a microphone) and begins collecting ambient audio samples or snippets, as described above in subsections I and III. In step 603, the rendezvous application converts each snippet into m-frames, and each frame is processed by contrast filters and thresholded to produce a k-bit descriptor. The k-bit descriptors form an audio summary. In step 604, the rendezvous application sends the audio summary from the client interface to the server via a network.

In step 605, the server receives the audio summary from the client interface 102 via the network. In step 606, the server compares the audio summary with each of the other audio summaries received from other client interfaces. In step 607, when the server determines the audio summary substantially matches the audio summary received from the other client interfaces, the server proceeds to step 608, otherwise, the server proceeds to step 610. In step 608, the server adds the client interface to a list of other client interfaces that are all participating in a common audio environment, as described above in subsection III. The list also includes each client interface user id. In step 609, the server returns the list of participating client interfaces and user ids to the client interface. In step 610, the server returns a notification to the client interface that access to the rendezvous is denied indicating that the client interface is not part of the common audio environment.

Returning to operations performed by the client, in step 611, when the client interface receives the list of participating client interfaces from the server, proceed to step 612, otherwise, the rendezvous application can return to step 601 and steps 601-604 can be repeated. In step 612, the client interface can contact the server or another participating client interface provided in the list. In step 613, the client receives a prompt for joining with another participating client in an exchange of documents. In step 614, the client launches a collaboration application enabling the client interface to exchange documents via the network with selected client interfaces provided in the list.

In certain embodiments, the rendezvous application can be configured to periodically check whether or not a client interface is part of the common audio environment, thus enabling users to exit the audio environment at different times. In particular, the rendezvous application can be configured to periodically repeat steps 602-604 and rendezvous functions stored on the server can also periodically repeat steps 605-610. When a user is finished participating in the collaboration, the user simply removes an associated client interface, such as a laptop or a PDA, from the audio environment. The server receives an audio summary from the removed client interface and audio summaries from the client interfaces remaining in the common audio environment and determines the audio summary of the removed client interface no longer matches the audio summaries received from those client interfaces remaining in the common audio environment. Thus, the server removes the client from the list and severs the client interface connection with the other client interfaces that are still in the common audio environment.

In other embodiments, a client interface can also join an already existing audio environment established as described above in subsections I-III. The user activates the rendezvous application that generates and sends an audio summary to the server as described above in steps 601-604. Because the server periodically repeats steps 605-610, the server receives an audio summary from the recently entered client interface and determines the audio summary substantially matches the audio summaries received from those client interfaces already in the common audio environment. The server then joins the recently entered client interface to the already existing audio environment.

V. Other Embodiments

Figure 7:
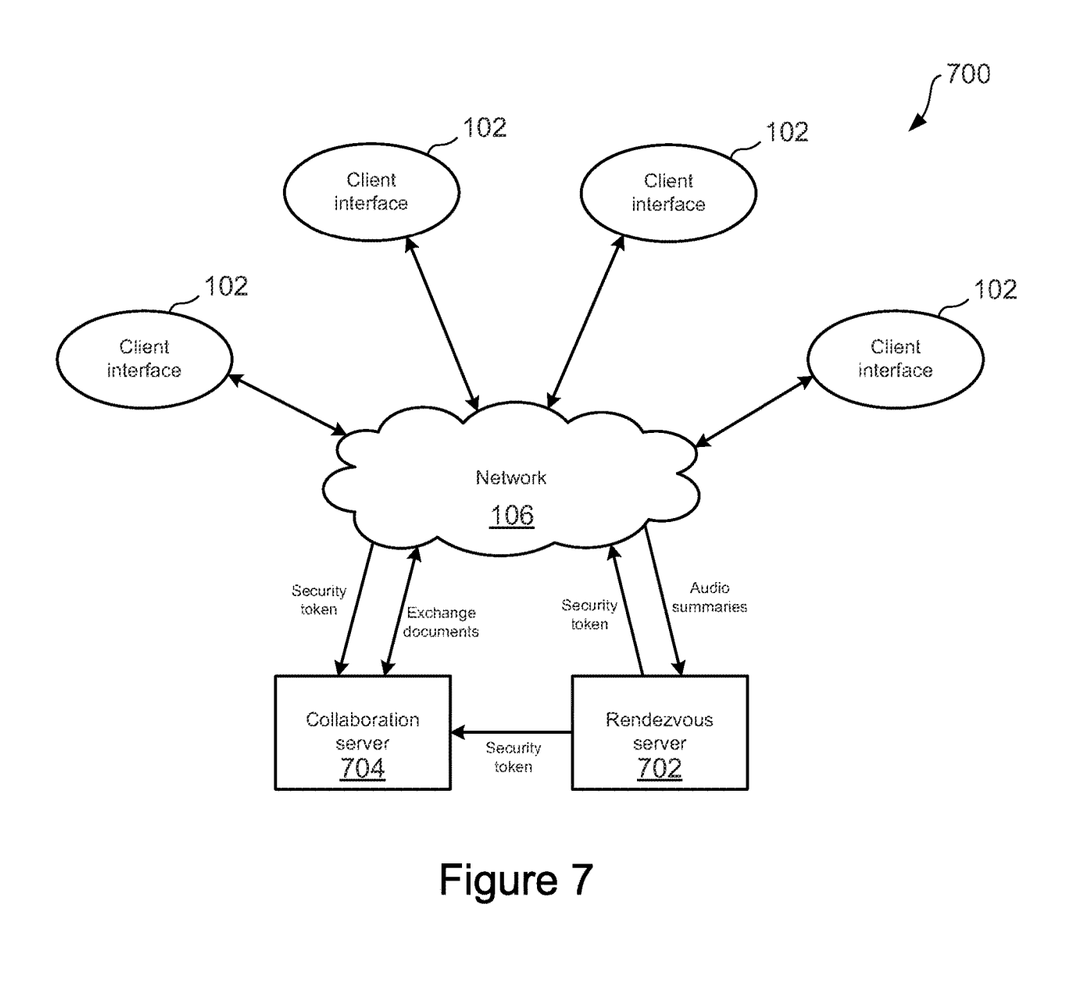
FIG. 7 shows a second rendezvous and collaboration system configured in accordance with embodiments of the present invention.

In other embodiments, two separate servers can be employed with a first server configured to handle rendezvous between client interfaces and a second server configured to handle collaborations where documents and other information are exchanged. FIG. 7 shows a rendezvous and collaboration system 700 for providing a collaborative exchange of information over a network in accordance with embodiments of the present invention. The system 700 is identical to the system 100 shown in FIG. 1 except the server 104 has been replaced by a rendezvous server 702 and a collaboration server 704. The rendezvous server 702 as described above in subsection I is a correlating device. The rendezvous server 702 receives audio summaries from the client interfaces 102 and returns a shared security token to only those client interfaces that are determined by the server 702 to be in a common audio environment, as described in subsections I-III. The security toke is also sent to the collaboration server 704. The security token can be a data packet comprising a binary password portion created by the rendezvous server 702 to operate like a password. When the client interfaces 102 receive the security token, associated users activate the collaboration application that sends the security token to the collaboration server 704, which compares the security tokens received from the client interfaces 102 to the security token received from the server 104. The security tokens matching the security token provided by the rendezvous server 702 are assumed to be in the common audio environment and are allowed to collaborate by exchanging documents via the collaboration server 704.

Figure 8:
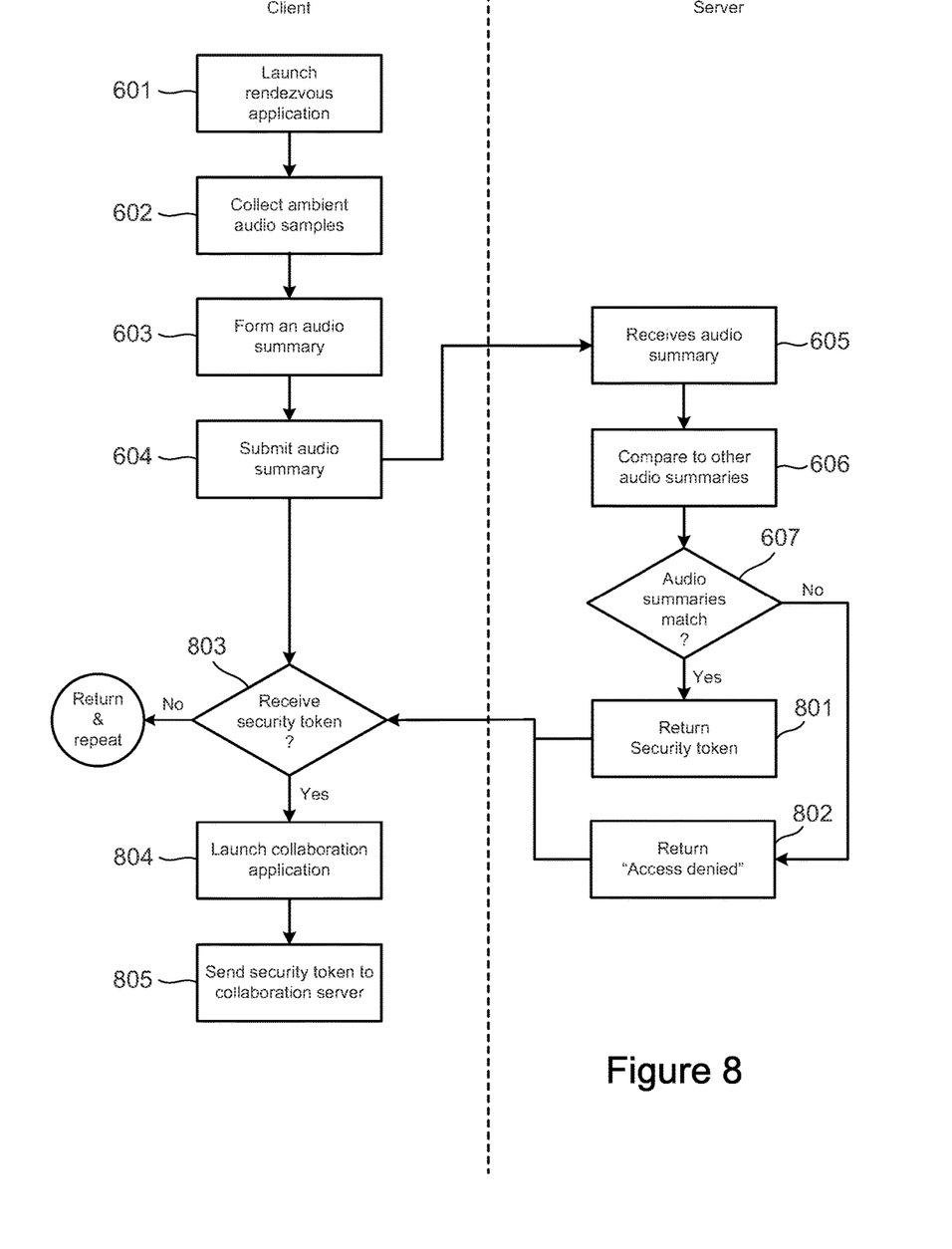
FIG. 8 shows a second control-flow diagram of operations performed by a client interface and a server in establishing a rendezvous and collaboration in accordance with embodiments of the present invention.

FIG. 8 shows a control-flow diagram of operations performed by a client interface 102 and the rendezvous server 702 in establishing a rendezvous and collaboration between the client interface 102 and other client interfaces 102 in accordance with embodiments of the present application. Steps 601-604 and steps 803-805 are performed separately by each client interface 102, and steps 605-607, 801, and 802 are performed by the rendezvous server 702.

The client interface 102 performs steps 601-604 and the rendezvous server 702 perform steps 601-607, 801, and 802. In step 607, when the audio summary substantially matches the audio summaries provided by other client interfaces, the rendezvous server 702 proceeds to step 801, otherwise, the rendezvous servers 702 proceeds to step 802. In step 801, the rendezvous server 702 sends a shared security token to the client interface 102, as described above with reference to FIG. 7. In step 802, the rendezvous server 702 returns a notification to the client interface 102 that access to the rendezvous is denied indicating that the client interface 102 is not part of the common audio environment.

Returning to operations performed by the client interface, in step 803, when the client interface 102 receives the security token from the rendezvous server 702, proceed to step 804, otherwise, the rendezvous application can return to step 601 and steps 601-604 can be repeated. In step 804, the client launches a collaboration application enabling the client to exchange documents via the network 106 and the collaboration server 704. In step 805, the client sends the security token to the collaboration server 704.

Figure 9:
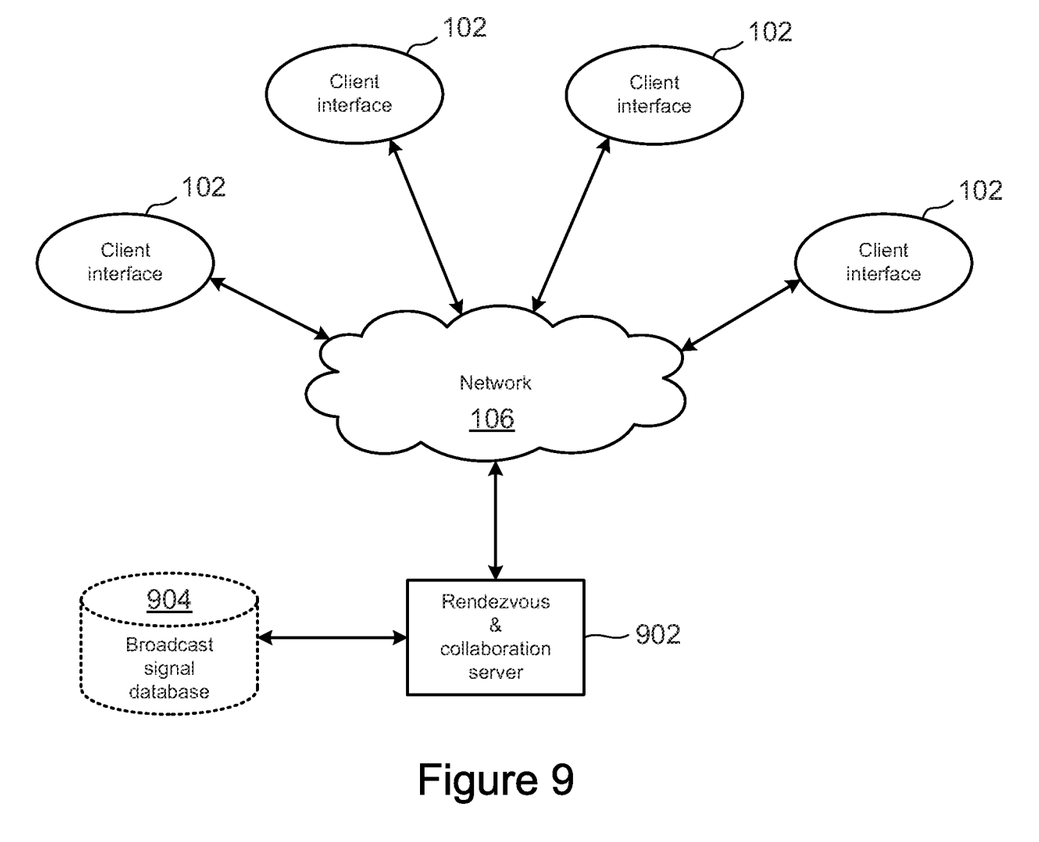
FIG. 9 shows a third rendezvous and collaboration system configured in accordance with embodiments of the present invention.

In other embodiments, the system can be configured to prevent client interfaces from being joined in unintended collaborative session when the client interfaces are in different audio environments but happen to form audio summaries based on the same broadcast event. FIG. 9 shows a rendezvous and collaboration system 900 for providing a collaborative exchange of information over a network in accordance with embodiments of the present invention. The system 900 is identical to the system 100 shown in FIG. 1 except a rendezvous and collaboration server 902 is connected to a broadcast signal database 904. The database 904 stores audio summaries of ambient audio obtained from television and radio broadcasts within a region where the server 902 and the client interfaces 102 are located. The region can be a city, a county, a state, or a multi-state region. The audio summaries stored in the database 904 are updated when a rendezvous process is started, and the audio summaries are updated while the client interfaces are engaged in a collaborative meeting. The server 104 compares the audio summaries provided by the client interfaces 102 with the audio summaries stored in the database 902 to eliminate client interfaces from being wrongly identified as collaborators in the common audio environment when in fact they are not. Consider, for example, two PDAs located in separate rooms but with the rendezvous application activated. Suppose the PDAs collect ambient audio from two televisions sets that happen to be tuned to the same channel. The server 104 compares the audio summaries provided by the PDAs with the audio summaries stored in the database 902 and determines that the PDAs substantially match the audio summaries obtained from the same broadcast. The server 104 denies joining the PDAs in a collaborative session.

Figure 10:
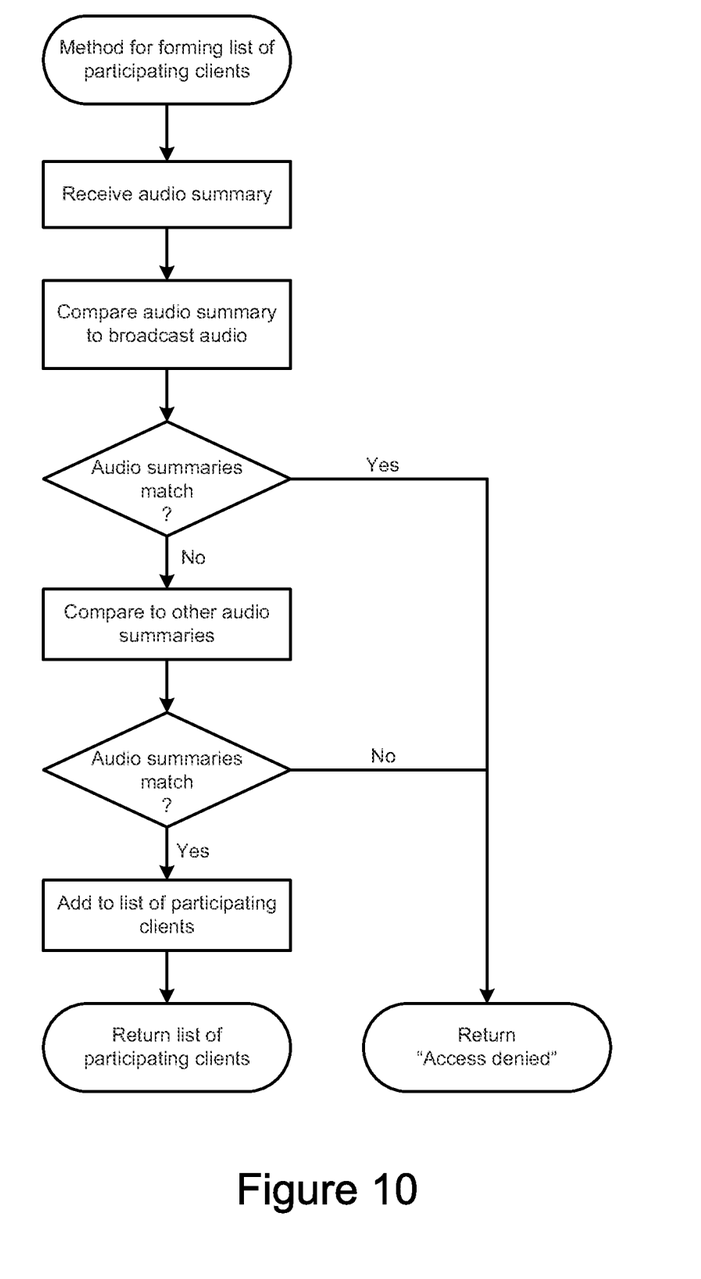
FIG. 10 shows a control-flow diagram of operations performed by a server in establishing a rendezvous and collaboration in accordance with embodiments of the present application.

FIG. 10 shows a control-flow diagram of operations performed by a rendezvous server in establishing a rendezvous and collaboration session between a client interface and other client interfaces in accordance with embodiments of the present application. Steps 1001-1008 can replace steps 605-610 in control-flow diagram described above with reference to FIG. 6. In step 1001, a server receives an audio summary from a client interface via a network. In step 1002, the server compares the audio summary provided by the client interface with audio summaries stored in a broadcast signal database, as described above with reference to FIG. 9. In step 1003, when the audio summary provided by the client interfaces match an audio summary stored in the database, proceed to step 1004, otherwise proceed to step 1005. In step 1004, the server returns a notification to the client interface that access to the rendezvous is denied. In step 1005, the server compares the audio summary provided by the client interface to a collection of other audio summaries received from other client interfaces. In step 1006, when the server determines the audio summary substantially matches the audio summary received from other client interfaces, the server proceeds to step 1007, otherwise, the server proceeds to step 1004. In step 1007, the server adds the client interface to a list of other client interfaces comprising a common audio environment, as described above in subsections III and IV. The list also includes each client interface user id. In step 1008, the server returns the list of participating client interfaces and user ids to the client interface.

The foregoing description, for purposes of explanation, used specific nomenclature to provide a thorough understanding of the invention. However, it will be apparent to one skilled in the art, that the specific details are not required in order to practice the invention. The foregoing descriptions of specific embodiments of the present invention are presented for purposes of illustration and description. They are not intended to be exhaustive of or to limit the invention to the precise forms disclosed. Obviously, many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A method for establishing an interconnection between a first client interface and a second client interface, the method comprising:
    during a meeting, forming a first audio summary at the first client interface and a second audio summary at the second client interface;
    during the meeting, submitting the first audio summary and the second audio summary to a correlating device comprising a collaboration server including a processor and memory and capable of comparing the first audio summary to the second audio summary; and
    during the meeting, receiving an indication of success or failure at the first client interface and the second client interface from the correlating device for establishing an interconnection between the first client interface and the second client interface, based on whether the first audio summary and the second audio summary form a common audio environment of the first client interface and the second client interface.

2. The method of claim 1 wherein forming the first audio summary and the second audio summary further comprise the first client interface and the second client interface each collecting audio samples using associated ambient audio detectors of ambient audio output from one or more people speaking.

3. The method of claim 1 wherein, when the first audio summary and the second audio summary form the common audio environment, receiving an indication of success further comprises the first client interface receiving a user identifier associated with the second client interface and the second client interface receiving a user identifier associated with the first client interface.

4. The method of claim 1 wherein, when the first audio summary and the second audio summary form the common audio environment, receiving an indication of success further comprises the first client interface receiving a first security token, the second client interface receiving a second security token, and the collaboration server receiving a third security token, the first, second, and third security tokens generated by the correlating device, wherein the collaboration server compares the security tokens and establishes an interconnection between the first client interface and the second client interface when the first, second, and third security tokens match.

5. The method of claim 1 wherein the correlating device compares time stamps of the first audio summary and the second audio summary in comparing the first audio summary to the second audio summary.

6. The method of claim 1 further comprising during the meeting, interconnecting the first client interface to the second client interface when the first audio summary and the second audio summary form the common audio environment.

7. The method of claim 6 further comprising severing the interconnection between the first client interface and the second client interface when the first audio summary and the second audio summary no longer match.

8. A method for establishing an interconnection between a first client interface and a second client interface in communication with a collaboration server including a processor and memory during a rendezvous experience of the first client interface and the second client interface, the method comprising:
    receiving, at the collaboration server during the rendezvous experience, a first audio summary from the first client interface and a second audio summary from the second client interface;
    sending, by the collaboration server during the rendezvous experience, an indication of success or failure to the first client interface and the second client interface, based on whether the first audio summary and the second audio summary form a common audio environment of the first client interface and the second client interface; and
    interconnecting, by the collaboration server during the rendezvous experience, the first client interface and the second client interface such that the first client interface and the second client interface can exchange information, when and the second audio summary form the common audio environment.

9. The method of claim 8 wherein the first audio summary and the second audio summary each further comprise a collection of audio samples of ambient audio output from one or more people speaking.

10. The method of claim 8 wherein sending an indication of success further comprises sending a user identifier associated with the second client interface to the first client interface and sending a user identifier associated with the first client interface to the second client interface, when and the second audio summary form the common audio environment.

11. The method of claim 8 wherein sending an indication of success or failure further comprises sending, during the rendezvous experience, an indication of success or failure to the first client interface and the second client interface, based on whether the first audio summary and the second audio summary were collected at substantially the same time.

12. The method of claim 8 wherein sending an indication of success further comprises sending a first security token to the first client interface, sending a second security token to the second client interface, and sending a third security token to the collaboration server, when and the second audio summary form the common audio environment.

13. The method of claim 12 further comprising the first client interface and the second client interface submitting the first and second security tokens to the collaboration server that compares the first and second security tokens to the third security token and establishes an interconnection between the first client interface and the second client interface when the first, second, and third security tokens match.

14. A system comprising:
a first client interface configured to collect ambient audio and form a first audio summary while a conference call is in progress;
a second client interface configured to collect ambient audio and form a second audio summary while the conference call is in progress; and
a correlating device comprised of a collaboration server including a processor and memory and configured to receive the first audio summary and the second audio summary and, when and the second audio summary form a common audio environment of the first client interface and the second client interface, interconnect the first client interface and the second client interface while the conference call is in progress such that the first client interface and the second client interface can exchange information.

15. The system of claim 14 wherein the first client interface and the second client interface each further comprise one of a desktop computer, a laptop computer, a portable computer, a telephone, a mobile phone, a display system, a television, a computer monitor, a navigation system, a portable media player, a personal digital assistant, a game console, a handheld electronic device, an embedded electronic device or appliance, a conference bridge.

16. The system of claim 14 wherein the first client interface and the second client interface each further comprise an ambient audio detector.

17. The system of claim 14 wherein the correlating device is configured to send a user identifier associated with the second client interface to the first client interface and send a user identifier associated with the second client interface to the first client interface, when and the second audio summary form the common audio environment.

18. The system of claim 14 wherein the correlating device is configured to send a first security token to the first client interface, send a second security token to the second client interface, and send a third security token to the collaboration server, the collaboration server configured to receive the first and second security tokens from the first and second client interfaces, respectively, and establish an interconnection between the first client interface and the second client interface when the first, second, and third security tokens match.

19. The system of claim 14 wherein the first audio summary and the second audio summary are each time stamped, and wherein the correlating device compares the time stamps in determining if the first audio summary and the second audio summary form the common audio environment.

20. The system of claim 14 wherein the correlating device is configured to sever the interconnect of the first client interface and the second client interface when at least one of the first client interface and the second client interface is removed from the common audio environment.

* * * * *

UNITED STATES PATENT AND TRADEMARK OFFICE
CERTIFICATE OF CORRECTION

PATENT NO. : 9,742,849 B2  Page 1 of 1
APPLICATION NO. : 13/146941
DATED : August 22, 2017
INVENTOR(S) : Mitchell Trott et al.

It is certified that error appears in the above-identified patent and that said Letters Patent is hereby corrected as shown below:

In the Claims

Column 12, Line 62, Claim 8, delete "when" and insert -- when the first audio summary --, therefor.

Column 13, Line 5, Claim 10, delete "when" and insert -- when the first audio summary --, therefor.

Column 13, Line 19, Claim 12, delete "when" and insert -- when the first audio summary --, therefor.

Column 13, Line 38, Claim 14, delete "when" and insert -- when the first audio summary --, therefor.

Column 14, Line 18, Claim 17, delete "when" and insert -- when the first audio summary --, therefor.

Signed and Sealed this
Thirteenth Day of March, 2018

Andrei Iancu
*Director of the United States Patent and Trademark Office*